United States Patent Office
3,399,010
Patented Aug. 27, 1968

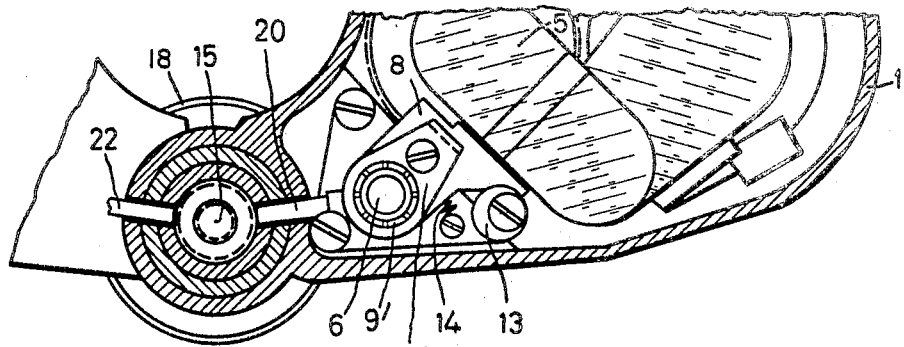
Fig. 2
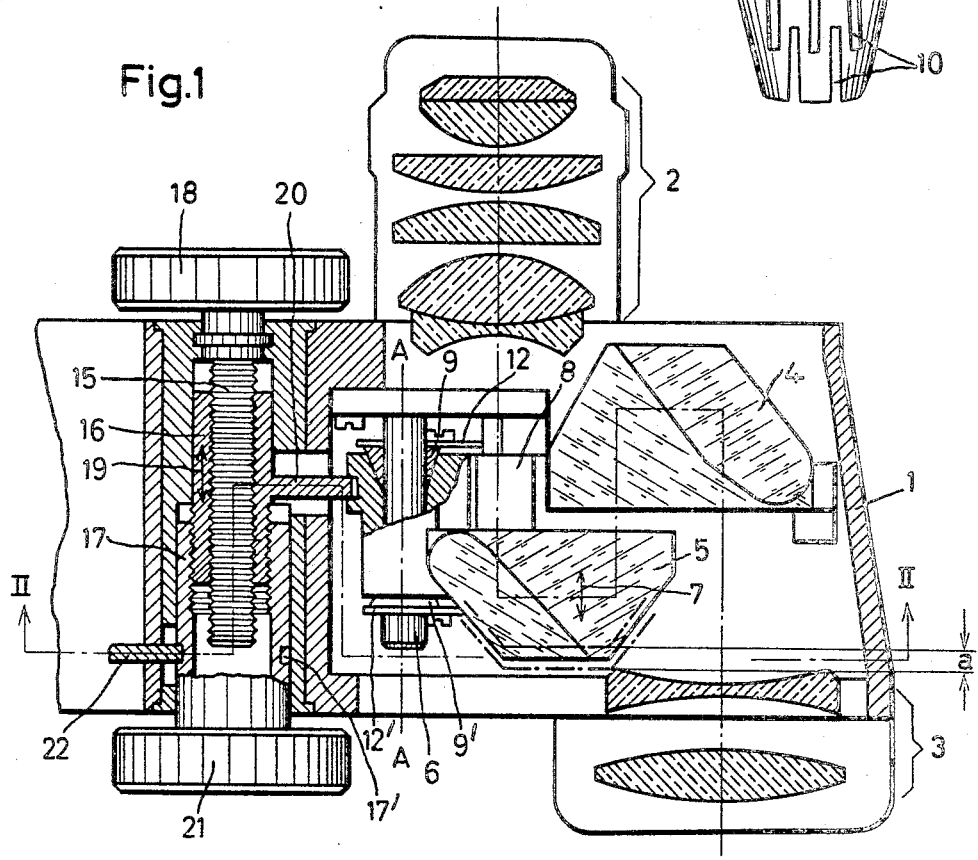
Fig. 3
Fig. 1
INVENTORS:
Berthold Böhmel
Joachim Hoensch
BY Singer, Stern & Carlberg
Attorneys.

3,399,010
FOCUSING DEVICE
Berthold Böhmel, Konigsbronn, Wurttemberg, and Joachim Hornschu, Oberkochen, Wurttemberg, Germany, assignors to Carl Zeiss-Stiftung, doing business as Carl Zeiss Heidenheim (Brenz), Wurttemberg, Germany, a corporation of Germany
Filed Sept. 17, 1965, Ser. No. 487,980
Claims priority, application Germany, Sept. 25, 1964, Z 11,090
4 Claims. (Cl. 350—47)

ABSTRACT OF THE DISCLOSURE

A focusing device for a binocular telescope in which in addition to the eyepieces and the objective lenses two Porro prisms are employed in each half of the binocular. One Porro prism is fixedly mounted and the other is adjustably mounted, firstly along a fixed guide post by means of a prism carrier which has mounted thereon two axially spaced conical guide sleeves which extend into oppositely arranged conical sockets in said prism carrier and slidably engage the guide post. Leaf springs attached to the prism carrier engage the guide sleeves and urge the same into the conical sockets.

Secondly, the prism carrier by means of an adjustable arm is adjustable about the axis of the guide post.

---

This invention relates to a focusing device for optical image reproduction systems and more particularly to telescopes equipped with Porro prisms of which at least one prism is arranged movably and is utilized for focusing.

It is an object of this invention to provide the movable prism with a linear guide of high guiding accuracy.

In accordance with this invention, the movable prism is secured to a prism carrier arranged for slidable movement along a fixedly mounted guide post by means of radially resilient guide bushings whose fit on the guide post is automatically adjusted by axially acting spring pressure. Moreover, the movable prism can additionally be arranged adjustably swingably about the axis of the guide post whereby simple setting for image erectness is made possible.

The invention will now be further described with reference to the accompanying drawing:

FIG. 1 is a sectional side view of one half of a binocular telescope equipped with the focusing device of the invention;

FIG. 2 is a cross-sectional front view of the same telescope along the broken line II—II of FIG. 1;

FIG. 3 is a perspective view of one form of a radially resilient guide bushing.

In FIGS. 1 and 2 only one half, the right-hand half, of the binocular is illustrated, because the left-hand half is of completely equivalent construction and therefore omitted.

In the embodiment shown in the drawing, there is mounted inside the housing 1, in addition to the optical system comprising the eyepiece or ocular 2 and the objective 3, two Porro prisms, of which one prism 4 is fixedly secured in the housing and the other prism 5 is attached, for instance by adhesive, to a prism carrier 8 which in turn is slidably arranged on a guide post 6 for sliding movement in a direction parallel to the optical axis of the objective 3 as indicated by the double arrow 7. Proper fitting of prism carrier 8 on guide post 6 is effected by means of guide bushings 9 and 9' which are provided with a certain radial resilience, for example, by radial slots 10 in the conical body 11 of the bushings as is indicated in detail in FIG. 3. The bushings 9 and 9' extend with their smaller ends into conical sockets provided in the end walls of the carrier 8.

The guide bushings 9 and 9' are contracted for proper minimum sliding clearance on guide post 6 by apertured leaf springs 12 and 12' attached to the end faces of the carrier 8 and acting in axial direction of the post. Thus, proper fit is automatically obtained owing to proper spring tension, conical shape of and the radial cuts in the bushings.

The construction just described provides also for an adjustment by swinging movement of the prism carrier 8, and, in turn, of the Porro prism 5 about the axis A—A of guide post 6. This swinging adjustment can be made by actuating eccentric cam 13, shown in FIG. 2, against which the prism carrier 8 is continuously urged by a spring 14. The provision of this additional adjustment by swinging the prism is of benefit in setting for image erectness.

The linear displacement of the prism carrier 8 and prism 5 within the adjustment range $a$, and similar simultaneous movement of the corresponding members in the left-hand half of the binocular, not shown in the drawing, is effected by a rotatably mounted adjustment screw 15 which axially moves the nut 16 and sleeve 17, which latter is interiorly threaded and threadedly engages an exterior thread on the nut 16, in one of the two directions indicated by the double arrow 19, depending on the direction of rotation of the knurled button 18 forming a part of the screw 15. The nut 16 is provided with a radial extension 20 which engages a recess in the prism carrier 8, and sleeve 17 attached to the knurled button 21 is provided with an annular groove 17' into which projects an extension 22 of the other prism carrier disposed in the left-hand half of the binocular housing.

From the construction thus described it will be apparent that by turning the button 18, both prism carriers, that is in the left as well as in the right-hand half of the binocular, are moved simultaneously and in the same direction, whereby over-all focusing is achieved; whereas by turning the button 21, only one prism carrier, here the left-hand one (not shown) is moved, whereby single focusing, for instance, to correct spherical defects in vision of the observer, is obtained.

This invention by no means is restricted to the use in binocular telescopes, but can be beneficially utilized in all kinds of optical reproduction systems being equipped with Porro prisms.

What we claim is:

1. The combination of an optical instrument having a housing, comprising spaced prisms, one of which is movably arranged and is employed for focusing, linear guide means for said movably arranged prism connected to said housing, manually operable means connected to said housing, said linear guide means comprising a guide post, a prism carrier on which said movable prism is fixedly attached, said prism carrier being movably mounted on said guide post by means of axially spaced radially compressible conical guide sleeves and connected to said manually operable means, said guide sleeves extending into conical sockets provided in opposite end faces of said prism carrier, and spring means attached to said prism carrier and engaging said guide sleeves for axially urging said guide sleeves in a direction in which the latter are contracted to slidably engage said guide post.

2. The combination of an optical instrument having a housing, comprising spaced prisms, one of which is movably arranged and is employed for focusing, linear guide means for said movably arranged prism connected to said housing, manually operable means connected to said housing, said linear guide means comprising a guide post, a prism carrier on which said movable prism is fixedly attached, said prism carrier being movably mounted on said guide post by means of axially spaced radially compressible conical guide sleeves and connected to said manually operable means, said guide sleeves extending into conical sockets provided in opposite end faces of said prism carrier, spring means attached to said prism carrier and engaging said guide sleeves for axially urging said guide sleeves in a direction in which the latter are contracted to slidably engage said guide post, and means for pivotally adjusting said prism carrier with the prism thereon about the axis of said guide post.

3. A focusing device according to claim 1, in which said conical guide sleeves are provided with slots to make them radially compressible when urged in axial direction of said guide post into said conical sockets provided in said prism carrier.

4. A focusing device according to claim 1, including an adjustable rotatable cam in engagement with said prism carrier for adjusting the latter about the axis of said guide post, and spring means for urging said prism carrier in engagement with said eccentric cam.

References Cited

UNITED STATES PATENTS

| | | | |
|---|---|---|---|
| 1,807,613 | 6/1931 | Bauersfeld et al. | 350—202 X |
| 2,404,385 | 7/1946 | Fritts | 279—41 X |
| 2,436,576 | 2/1948 | Kende et al. | 350—72 |
| 2,638,032 | 5/1953 | Kieffer et al. | 350—287 X |
| 2,811,895 | 11/1957 | Jensen | 350—36 X |

FOREIGN PATENTS 285,116   7/1928   Germany.

DAVID SCHONBERG, *Primary Examiner,*

P. R. GILLIAM, *Assistant Examiner.*